(12) United States Patent
Koukol, Jr.

(10) Patent No.: US 8,594,588 B2
(45) Date of Patent: *Nov. 26, 2013

(54) SELF EVALUATING TRANSMITTER

(75) Inventor: John L. Koukol, Jr., North Attleboro, MA (US)

(73) Assignee: Invensys Systems, Inc., Foxboro, MA (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/353,698

(22) Filed: Jan. 19, 2012

(65) Prior Publication Data

US 2012/0214430 A1 Aug. 23, 2012

Related U.S. Application Data

(63) Continuation-in-part of application No. 12/417,873, filed on Apr. 3, 2009, now Pat. No. 8,145,145.

(51) Int. Cl.
*H01Q 11/12* (2006.01)
(52) U.S. Cl.
USPC ............................ 455/91; 455/127.2
(58) Field of Classification Search
USPC ............. 455/91, 127.2, 103, 114.2, 126
See application file for complete search history.

(56) References Cited

U.S. PATENT DOCUMENTS

| 5,654,504 | A | 8/1997 | Smith et al. | |
|---|---|---|---|---|
| 6,834,258 | B2 | 12/2004 | Schulte et al. | |
| 7,107,176 | B2 * | 9/2006 | Henry et al. | 702/127 |
| 7,254,518 | B2 | 8/2007 | Eryurek et al. | |
| 8,145,145 | B2 | 3/2012 | Koukol, Jr. | |
| 2007/0178842 | A1 * | 8/2007 | Ii | 455/67.11 |
| 2008/0081674 | A1 | 4/2008 | Orr | |
| 2009/0143101 | A1 | 6/2009 | Rofougaran | |
| 2010/0035632 | A1 * | 2/2010 | Catten | 455/456.1 |

FOREIGN PATENT DOCUMENTS

JP 2003-214970 7/2003

OTHER PUBLICATIONS

Non-Final Office Action dated Dec. 8, 2011 regarding U.S. Appl. No. 12/417,873, 5 pages.
Response to Non-Final Office Action filed Dec. 9, 2011 regarding U.S. Appl. No. 12/417,873, 9 pages.
International Search Report dated May 10, 2010 regarding PCT/US2010/027375, 2 pages.
Written Opinion of the International Searching Authority dated May 10, 2010 regarding PCT/US2010/027375, 7 pages.

* cited by examiner

*Primary Examiner* — Henry Choe
(74) *Attorney, Agent, or Firm* — Edward S. Jarmolowicz, Esq.

(57) ABSTRACT

A self-evaluating process control transmitter system includes a transmitter configured to capture output data from an integral sensor, and a transmitter memory integrally disposed with the transmitter. The transmitter memory is configured to store a plurality of sets of the output data thereon, including an initial as-built data set, and at least one subsequent data set. A self evaluation module integrally disposed with the transmitter, in communication with the transmitter memory is configured to identify one or more variations between the as-built data set and at least one subsequent data set.

10 Claims, 5 Drawing Sheets

SELF EVALUATING TRANSMITTER

REFERENCE TO RELATED APPLICATIONS

This application is a continuation-in-part of U.S. patent application Ser. No. 12/417,873, filed Apr. 3, 2009, entitled "Self Evaluating Transmitter," the teachings are incorporated herein by reference.

BACKGROUND

1. Technical Field

This invention relates to process control transmitters, and more particularly to the evaluation of potential performance degradation over time.

2. Background Information

Process control transmitters are commonly used in modern process control systems to capture data associated with any number of process variables. Pressure transmitters, for example, refer to a family of instruments having sensors constructed to measure and indicate pressure exerted typically by gases and liquids. Pressure is an expression of the force required to stop a fluid (or other substance) from expanding, and is usually stated in terms of force per unit area. A pressure transmitter generates a signal related to the pressure imposed. Typically, such a signal is electrical, but optical, visual, and auditory signals are examples of other available technologies.

Pressure sensors are used for control and monitoring in numerous everyday applications ranging from industrial processes to consumer appliances. Pressure sensors can also be used to indirectly measure other variables such as fluid/gas flow, speed, water level, and altitude. Pressure transmitters may colloquially be referred to as pressure transducers, pressure sensors, pressure senders and pressure indicators, along with other names.

Process control transmitters are relatively sophisticated, intelligent instruments, typically including accurate sensors, a processor and memory, a communications client configured for communication using a process control protocol such as HART, FOUNDATION fieldbus, FOXCOM and PROFIBUS, etc, and an on-board display, all in an industrially hardened enclosure. These instruments thus tend to be relatively expensive, and as such, it is desirable to use them for their full useful life prior to replacement. However, costs associated with degraded performance and ultimately process downtime due to unanticipated instrument failure and replacement may be many times more expensive than the cost of the instrument itself. This may encourage users to engage in an overly aggressive instrument replacement schedule, which effectively replaces transmitters which in many instances still have long remaining useful lives. A need therefore exists for a transmitter capable of addressing the aforementioned drawbacks.

SUMMARY

According to one aspect of the present invention, a self-evaluating process control transmitter system includes a transmitter configured to capture output data from an integral sensor, and a transmitter memory integrally disposed with the transmitter. The transmitter memory is configured to store a plurality of sets of the output data thereon, including an initial as-built data set, and at least one subsequent data set. An as-built data set is stored on the transmitter memory. A self evaluation module is integrally disposed with the transmitter, in communication with the transmitter memory and is configured to identify one or more variations between the as-built data set and at least one subsequent data set.

In another aspect of the invention, a method for monitoring the performance of a process control transmitter having an integral sensor, includes installing the transmitter in a process, and capturing, on the transmitter memory, an installed data set corresponding to output of the sensor at known conditions after the installation. An integral self evaluation module is used to compare the installed data set to an as-built data set stored on the transmitter memory, the as-built data set corresponding to output of the integral sensor at predetermined conditions. The self evaluation module is used to identify any variation between the installed data set and the as-built data set that may indicate degradation.

In still another aspect of the invention, a self-evaluating process control transmitter system for the evaluation of pressure transmitter degradation, includes a pressure transmitter configured to capture output data from an integral pressure sensor. The pressure transmitter has a memory with initial as-built output data and a predetermined acceptable range of data variation stored thereon. The transmitter memory is also configured to store subsequent output data thereon, along with temporal, orientation, and ambient temperature information associated therewith. The transmitter includes a self evaluation module communicably coupled to the transmitter memory and configured to standardize output data by adjusting for temperature and orientation. The self evaluation module is configured to identify variations between the as-built output data and the subsequent output data, and to identify variations between individual sets of subsequent output data. The self evaluation module is also configured to determine a trend of the output data over time, and to identify variations between the trend and individual sets of the subsequent output data.

In yet another aspect of the present invention, a self-evaluating process control transmitter system includes a transmitter configured to capture output data from an integral sensor, and a transmitter memory integrally disposed with the transmitter. The transmitter memory is configured to store a plurality of sets of the output data thereon, including a prior data set, and a plurality of subsequent data sets. A self evaluation module is integrally disposed with the transmitter, in communication with the transmitter memory and is configured to determine a trend of the output data sets over time. The self evaluation module is also configured to identify one or more variations between the prior data set and at least one of the subsequent data sets.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
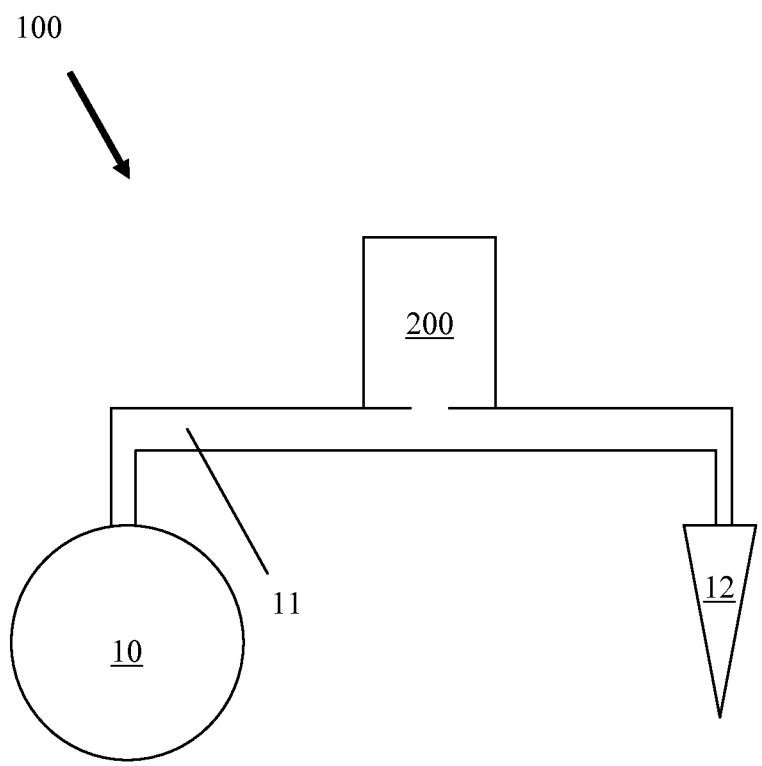
FIG. 1 is a schematic view of an embodiment of the subject invention integrated into a process.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Where used in this disclosure, the term 'sensor output data', or 'sensor output characteristics', refers to information retrieved from a sensor that indicates the quantitative measurement of the process variable to be measured by the sensor. The term 'real time' refers to sensing and responding to external events nearly simultaneously (e.g., within milliseconds or microseconds) with their occurrence, or sufficiently fast to enable the device to keep up with an external process.

As will be discussed hereinbelow, embodiments of the present invention include a computer program code-based product, which includes a computer readable storage medium having program code stored therein which can be used to instruct a processor-based process control transmitter to perform any of the functions, methods and/or modules associated with the present invention. The computer storage medium may include any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Aspects of the various embodiments of the present invention may be programmed in any suitable language and technology known and available to those skilled in the art. Non-limiting examples include Hypertext Markup Language (HTML), Active ServerPages (ASP) and Javascript, C++; Visual Basic; Java; VBScript; Jscript; BCMAscript; DHTM1; XML and CGI. Any suitable database technology may be employed, but not limited to: Microsoft Access and IBM AS 400.

In one embodiment of the present invention, a pressure transmitter includes a pressure sensor, a memory module, and a self evaluation module. Output data from the pressure sensor may be recorded on the memory module under known conditions (e.g. temperature, pressure and orientation), when in 'as-built' condition prior to being shipped to the customer. As is known to someone skilled in the art, head pressure varies depending on orientation so as-built data may be recorded in more than one orientation (e.g. vertical and horizontal). The known pressure may be an easily reproducible one, such as atmospheric pressure at a particular sea level. Temperature may be recorded and adjusted by an algorithm built into the transmitter. Taking into account accuracy of readings and other factors an acceptable variation of output data under known conditions may also be recorded in transmitter memory. The pressure transmitter can then at a later time record subsequent output data. This output data may be adjusted for factors such as temperature, orientation and pressure (e.g. if the new pressure is known but different from prior output data conditions). The self evaluation module may then allow for comparison of new output data to: as-built data; prior "as installed" data; and trends in data including multiple prior sets of output data. In this regard, it should be recognized that 'as-built' data may correspond to substantially any data captured while the transmitter is in substantially 'new' condition, i.e., prior to an initial customer installation. The self evaluation module may further be configured to alert the user if these comparisons exceed allowable preset ranges of variation.

A self evaluating transmitter has substantial benefits. Typical user evaluations consist of comparing performance to only the last checkpoint, at which time the user typically readjusts the transmitter calibration to correct for any shifts in performance. When this is done repeatedly, the reference performance becomes the performance at the last checkpoint and the user loses any reference to past as-built or as-installed performance. Thus the user has no information as to trends or performance shifts over the multiple checkpoints. The embodiments of the self evaluating transmitter disclosed herein, provide this information. It may reduce downtime and improve the useful life of the transmitter by allowing an accurate evaluation of the sensor's continuing performance before arbitrary replacement. This can be particularly valuable in large industrial processes where shutdowns and startups may be complicated and protracted events, with substantial loss of productivity.

Although the embodiments described in this application refer primarily to pressure transmitters in order to illustrate aspects of the invention, there is no intent to limit the use of the invention to a particular type of transmitter. Substantially any transmitter that provides data over time may utilize an embodiment of the current invention to evaluate the continuing integrity, or alternatively the degradation, of one or more sensors associated therewith. Some examples of sensor types that may be used with embodiments of the present invention are flowmeters, thermal sensors, chemical sensors, electromagnetic sensors, optical sensors, strain gauges, location sensors, electrical sensors such as voltmeters, auditory sensors such as sonar, and pressure sensors among others. Particular examples of transmitters that may be equipped with aspects of the invention discussed herein, include the Foxboro® IAP10, IAP20, IGP10, IGP20, IDP10, IGP25, IDP25, IGP50 and IDP50 transmitters, the IMV25 and IMV30 multivariable transmitters, and others, all commercially available from Invensys Systems, Inc. of Foxboro Mass., USA.

Turning now to the figures, exemplary embodiments of the present invention will be described in detail. Referring to FIG. 1, an embodiment of the invention shown as a self-evaluating pressure transmitter 200 is installed in an exemplary, simplified, fluid process 100. Fluid moves from a pump 10 through a process tube 11 and out of the system through a nozzle 12. As shown, transmitter 200 penetrates the process allowing for a pressure measurement to be taken at that location.

Figure 2:
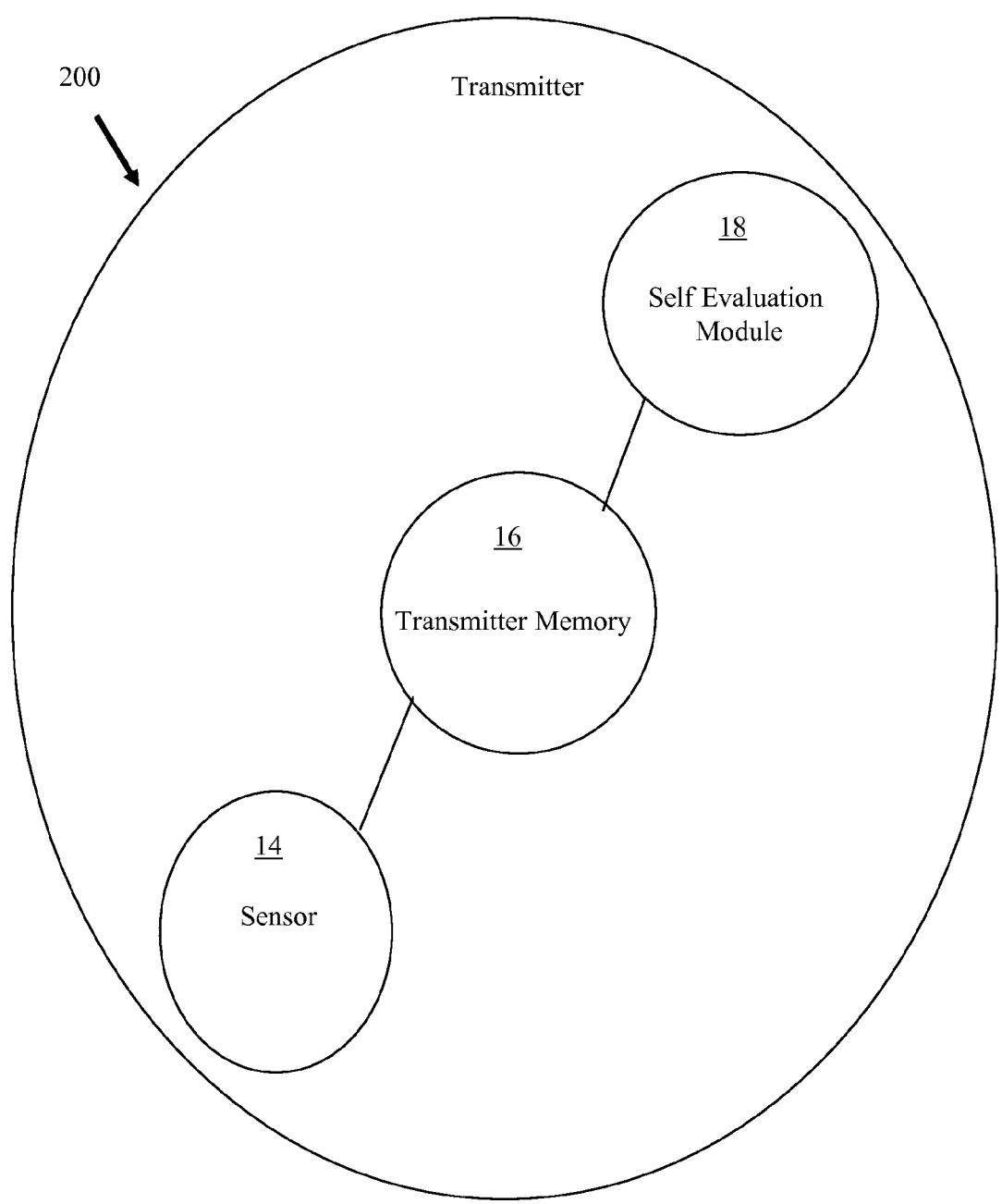
FIG. 2 is a schematic view of an embodiment of the invention showing component modules of the invention.

Turning to FIG. 2 in a representative embodiment, transmitter 200 includes three modules. A sensor module 14 obtains output data corresponding to the process variable (e.g., pressure) of interest, obtained from an integral sensor at an original as-built condition, and/or at one or more as-installed evaluation points thereafter. It should be noted that the integral sensor may be disposed either within the transmitter housing or remotely therefrom via a suitable communication link. That output data is then recorded or captured in transmitter memory 16. The self evaluation module 18 compares sets of output data from the pressure sensor 14 stored in the transmitter memory 16 to evaluate any deviation from an as-built or initial as-installed value. When this procedure is performed under substantially similar controlled conditions, variation in the output data evaluated by the self evaluation module 18 may indicate degradation of the transmitter 200. In the case of the pressure transmitter 200 relevant factors for controlled conditions may include similar pressure (such as by exposure to atmospheric or other standard pressure), temperature and orientation (e.g. vertical or horizontal). This is discussed in greater detail in FIG. 4 below.

Figure 3:
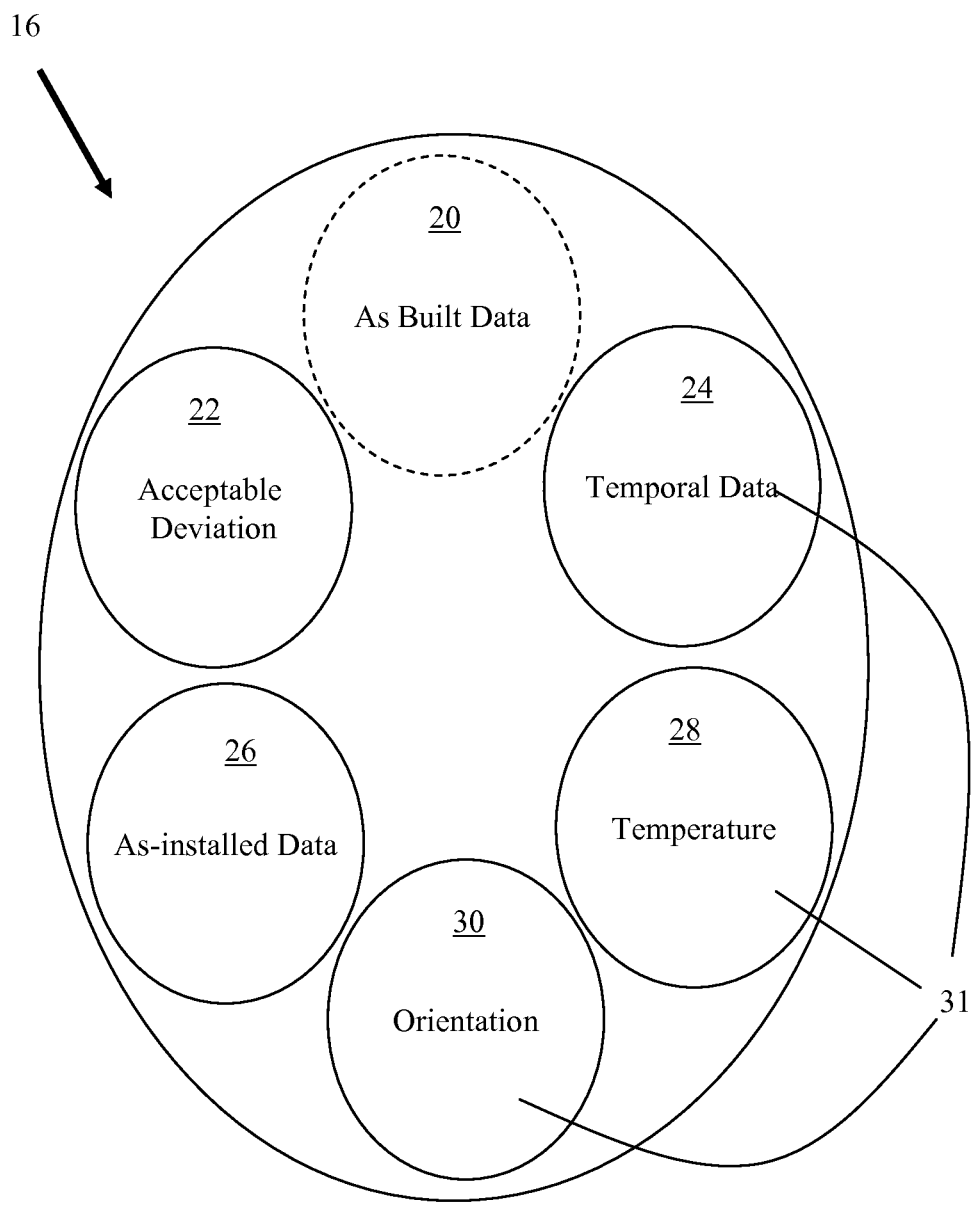
FIG. 3 is a schematic view an embodiment of one of the modules of FIG. 2 showing sub-modules therein.

Turning now to FIG. 3 an embodiment of a transmitter memory 16 is shown and described with relevant sub-modules. The modules represent examples of relevant data types that may be stored thereon. Optionally, as-built output data may be recorded on module 20 (shown in phantom) prior to installation of the transmitter 200. A predetermined allowable range of deviation between readings may be entered at module 22. At one or more as-installed evaluation points, sensor output data is captured and stored at module 26. In the embodiment of FIG. 3 the transmitter memory 16 is configured for a pressure transmitter 200, so that the sensor output data captured at 26 includes pressure data. In the embodiment shown, the output data captured and stored at 26 may be supplemented by data for various relevant factors 31 that may be recorded manually or by integrating additional sensors into the transmitter 200. In the embodiment shown, these factors 31 may include temperature 28, orientation 30, and the temporal evaluation point 24 (e.g. time and date) of the evaluation point at which the sensor output was captured 26.

Figure 4:
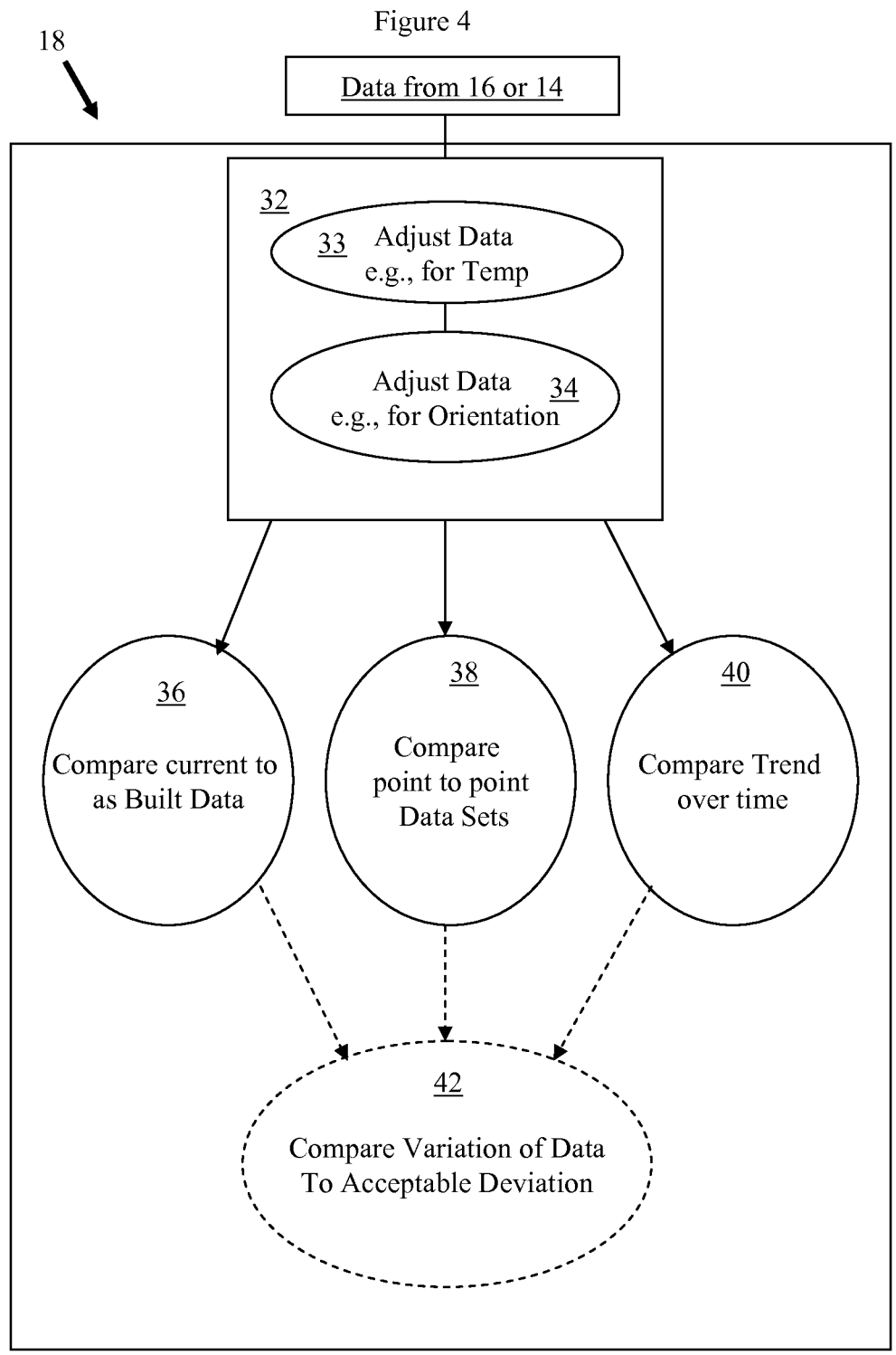
FIG. 4 is a schematic view an embodiment of another one of the modules of FIG. 2 showing sub-modules therein.

Turning now to FIG. 4, an embodiment of a self evaluation module 18 is shown and described. The self evaluation module retrieves information from the transmitter memory 16. Alternatively, output data may be received directly from sensor 14, e.g., in real time. Standardization module 32 standardizes raw data for relevant factors 31, such as shown in sub module 33 which adjusts the data from sensor module 14 for the ambient temperature 28. Another adjustment may be made at module 34 to compensate for any differences in orientation 30 of the pressure transmitter 200. The orientation of pressure transmitter 200 is relevant because positioning relative to the earth's gravitational field will influence the head pressure, particularly of a liquid flow as would be understood by one skilled in the art. Once adjusted for relevant factors 31, data is compared. It should be recognized that this data comparison may involve any number of algorithms and statistical comparisons known or otherwise available to those skilled in the art in light of the instant disclosure. For the purpose of illustration, three examples are provided. In one example, at module 36, sensor data (i.e., a data set) 26 as adjusted and standardized by modules 33 and 34, is compared to the as-built data 20 stored in transmitter memory 16. Optionally, data sets captured at two or more distinct evaluation points may be compared to one another at module 38. This may be useful when as-built conditions were not captured and/or cannot be replicated such as when the orientation of the pressure transmitter is unusual as installed, and as-built data may only have been recorded in a limited number of orientations (e.g. horizontal and vertical). Another beneficial indicator of continuing performance may be obtained by comparing a current adjusted data set to trends defined by aggregated data from multiple evaluation points, at trend module 40. The variation evaluated in modules 36, 38 and 40 may be used directly, such as by output on a display associated with the transmitter 200. Optionally, self evaluation module 18 may include a deviation module 42 (shown in phantom), configured to compare the evaluated variations identified by modules 36, 38, and/or 40, with the predetermined allowable deviations 22 (FIG. 3) discussed hereinabove. The self evaluation module 18 may then be configured to indicate, e.g., via an alarm or similar signal, whether variation in readings exceeds an allowable threshold of variation, such as by output to a display.

It should be recognized that any of the outputs described herein may be conveyed in substantially any manner configured to successfully communicate the desired information to a user. For example, information may be output to a display physically integrated within the transmitter 200. Alternatively, or in addition, such information may be transmitted to user, wirelessly, via dedicated hard wire, or via a process control network associated with the transmitter. In this regard, the information may be transmitted to user located in a central control room for the process control network. Alternatively, such information may be transmitted to a handheld device of a technician or other user working on a factory floor.

Figure 5:
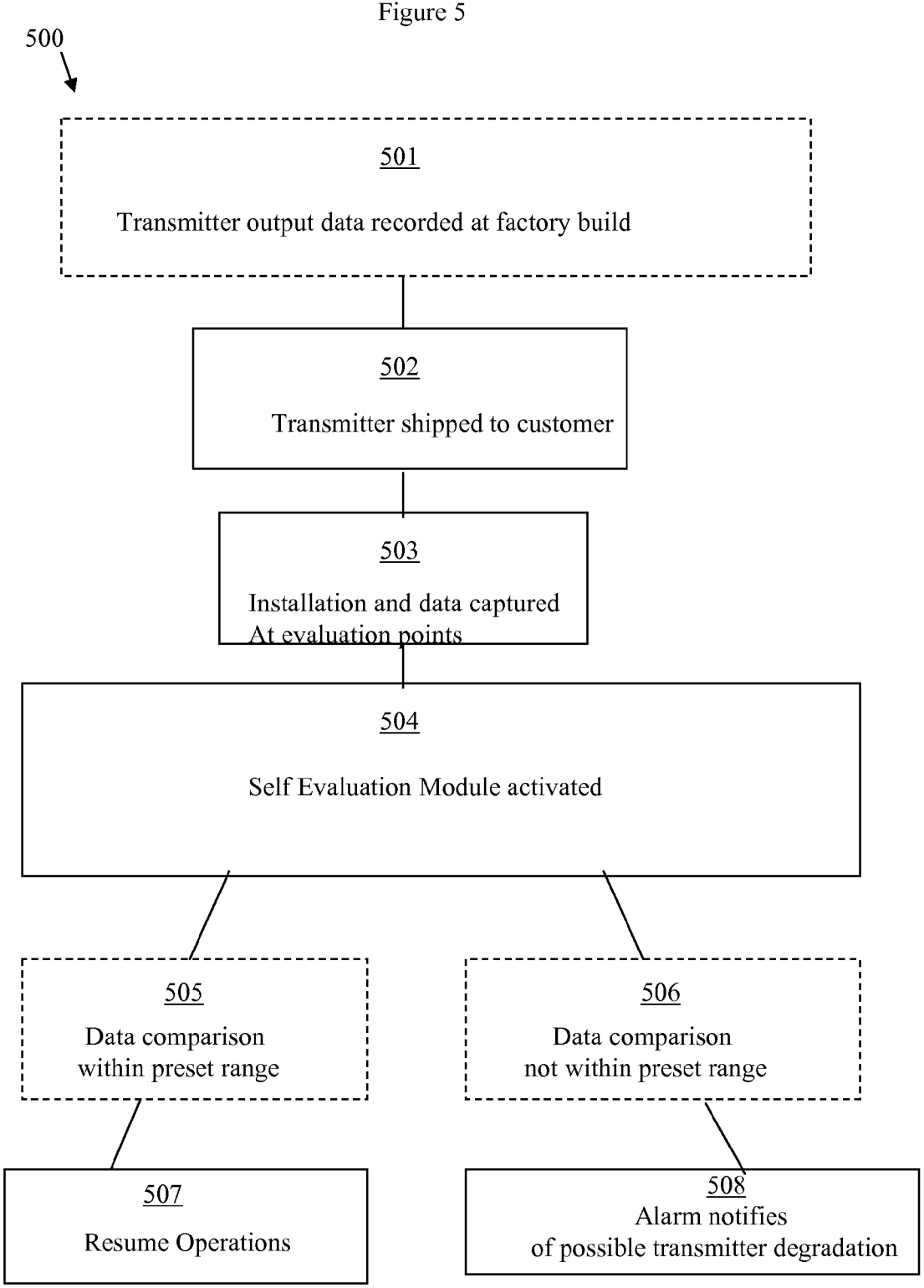
FIG. 5 is a flowchart of a representative method in accordance with the present invention.

In FIG. 5 an exemplary method for performing a self evaluation on a transmitter is shown at 500. This method need not be restricted to pressure transmitters as it may be applied to other types of sensor/transmitters. The method shown in FIG. 5 is intended as a non restrictive illustration of one possible method. As shown, a (e.g., pressure) transmitter 200 optionally records raw sensor output data at the factory build under known conditions (the 'as-built' conditions) shown in phantom at 501. In the case of a pressure transmitter this raw data may include the actual pressure sensor data along with data pertaining to relevant factors such as temperature and orientation. The transmitter is shipped to the customer at 502. The transmitter is then installed in the customer's process or application and operated at 503 to capture output data at one or more 'as-installed' evaluation points. The self evaluation module is activated 504 under conditions (e.g. pressure, temperature and orientation) similar to the as-built conditions (and/or the previous evaluation points), to effect a controlled comparison of the sensor's continuing performance, e.g., by comparing data from a current evaluation point to trends over time of prior evaluation points. The self evaluation module may also optionally compare variations in data against preset acceptable ranges of deviation as shown in phantom at 505 and 506. In the event data falls within an acceptable range of deviation at 505, then the self evaluation module may indicate to resume operation at 507. If the variation falls outside the acceptable range at 506, then the self evaluation module may indicate an alarm at 508 to signal likely transmitter degradation.

The foregoing embodiments thus provide a convenient way for consumers to maximize the available lifetime of pressure transmitters while ensuring their continued accuracy, by providing on site evaluation of the pressure transmitter to determine any possible degradation of its performance prior to failure or substantially compromised results.

It should be noted that the various modules and other components of the embodiments discussed hereinabove may be configured as hardware, as computer readable code stored in any suitable computer usable medium, such as ROM, RAM, flash memory, phase-change memory, magnetic disks, etc., and/or as combinations thereof, without departing from the scope of the present invention.

It should be understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

Having thus described the invention, what is claimed is:

1. A self-evaluating process control transmitter system, said system comprising:
   a transmitter configured to capture output data from an integral sensor;
   a transmitter memory integrally disposed with said transmitter;
   said transmitter memory configured to store a plurality of sets of said output data thereon, including an initial as-built data set, and at least one subsequent data set;
   an as-built data set stored on said transmitter memory;
   a self evaluation module in communication with said transmitter memory and configured to identify one or more variations between said as-built data set and at least one subsequent data set;
   wherein said transmitter memory is configured with an acceptable range of data variation stored thereon;
   wherein said self evaluation module is configured to compare said one or more variations with said acceptable range of data variation; and,
   wherein said self evaluation module is configured to identify a variation between an individual one of said plurality of data sets and a trend of said output data sets over time, and to compare said variation with said acceptable range of data variation.

2. The system of claim 1, wherein said transmitter is a pressure transmitter and said sensor is a pressure sensor.

3. The system of claim 1, wherein said self evaluation module is configured to identify variations between a plurality of subsequent data sets.

4. The system of claim 3, wherein said self evaluation module is configured to determine a trend of said output data sets over time.

5. The system of claim 4, wherein said self evaluation module is configured to identify one or more variations between said trend and any of the subsequent data sets.

6. The system of claim 1 wherein said transmitter memory is configured to record temporal and ambient temperature information associated therewith.

7. The system of claim 6 wherein said self evaluation module is configured to standardize output data by adjusting for temperature.

8. The system of claim 1 wherein said transmitter memory is configured to record orientation information associated therewith.

9. The system of claim 8 wherein said self evaluation module is configured to standardize output data by adjusting for orientation.

10. The system of claim 1 wherein said self evaluation module is configured to generate a notification upon identification of a variation exceeding said acceptable range of data variation.

* * * * *